US010960334B2

(12) United States Patent
Corbett et al.

(10) Patent No.: US 10,960,334 B2
(45) Date of Patent: Mar. 30, 2021

(54) MAGNETIC CLOSURE SYSTEM FOR HVAC FILTER GRILLES AND METHOD OF USE

(71) Applicants: Jeffrey Corbett, St. George, UT (US); Jeffrey Stewart, Washington, UT (US)

(72) Inventors: Jeffrey Corbett, St. George, UT (US); Jeffrey Stewart, Washington, UT (US)

(*) Notice: Subject to any disclaimer, the term of this patent is extended or adjusted under 35 U.S.C. 154(b) by 153 days.

(21) Appl. No.: 16/171,694

(22) Filed: Oct. 26, 2018

(65) Prior Publication Data

US 2019/0126183 A1  May 2, 2019

Related U.S. Application Data

(60) Provisional application No. 62/577,215, filed on Oct. 26, 2017.

(51) Int. Cl.
| | |
|---|---|
| *B01D 46/00* | (2006.01) |
| *B01D 46/10* | (2006.01) |
| *F24F 13/08* | (2006.01) |

(52) U.S. Cl.
CPC ......... *B01D 46/0004* (2013.01); *B01D 46/10* (2013.01); *F24F 13/084* (2013.01); *F24F 13/085* (2013.01); *B01D 2265/023* (2013.01); *B01D 2279/35* (2013.01)

(58) Field of Classification Search
None
See application file for complete search history.

(56) References Cited

U.S. PATENT DOCUMENTS

| | | | | |
|---|---|---|---|---|
| 3,203,338 A | * | 8/1965 | Dry | F24F 13/00 454/318 |
| 3,358,578 A | * | 12/1967 | Meyer | F24F 13/08 454/307 |
| 3,522,923 A | * | 8/1970 | Charpentier | E04B 9/363 52/489.2 |
| 3,752,055 A | * | 8/1973 | Shuler | F24F 13/08 454/332 |
| 3,768,235 A | * | 10/1973 | Meyer | B01D 46/12 55/385.5 |
| 3,912,473 A | * | 10/1975 | Wilkins | B01D 46/10 55/501 |
| 4,961,849 A | * | 10/1990 | Hull | B01D 46/10 210/222 |
| 5,525,145 A | * | 6/1996 | Hodge | B01D 46/001 96/17 |
| 6,221,120 B1 | * | 4/2001 | Bennington | B01D 46/10 55/385.1 |
| 6,361,578 B1 | * | 3/2002 | Rubinson | B01D 46/0004 55/487 |
| 6,623,540 B2 | * | 9/2003 | Clayton | B01D 46/0005 55/480 |

(Continued)

*Primary Examiner* — Christopher P Jones
*Assistant Examiner* — Phillip Y Shao
(74) *Attorney, Agent, or Firm* — Gurr Brande & Spendlove, PLLC; Robert A. Gurr

(57) ABSTRACT

A magnetic closure system for HVAC filter grilles has at least one magnet coupled to the HVAC filter grille, the at least one magnet positioned so as to be interposed between the HVAC filter grille and an inner frame for receiving the HVAC filter grille, the magnet abutting both the filter grille and inner frame so as to magnetically couple the HVAC filter grille to the inner frame; and at least one handle on the exterior surface of the filter grille.

3 Claims, 5 Drawing Sheets

(56) References Cited

U.S. PATENT DOCUMENTS

| | | | | |
|---|---|---|---|---|
| 6,793,715 B1* | 9/2004 | Sandberg | ............... | B01D 46/10 55/486 |
| 8,021,454 B2* | 9/2011 | Braunecker | ............ | B01D 46/12 55/483 |
| 8,419,515 B1* | 4/2013 | Dillon | ................... | F24F 13/084 454/284 |
| 9,347,679 B2* | 5/2016 | Bruhnke | ............... | F24F 13/084 |
| 9,592,464 B2* | 3/2017 | Prax | ......................... | A61L 9/12 |
| 2007/0266685 A1* | 11/2007 | Ferguson | .............. | F24F 13/085 55/490 |
| 2013/0035032 A1* | 2/2013 | Schneider | .......... | H05K 7/20181 454/278 |
| 2018/0015404 A1* | 1/2018 | Branzelle | ........... | B01D 46/0009 |

\* cited by examiner

MAGNETIC CLOSURE SYSTEM FOR HVAC FILTER GRILLES AND METHOD OF USE

CROSS-REFERENCE TO RELATED APPLICATIONS

This application claims the benefit of U.S. Provisional Application Ser. No. 62/577,215, filed on Oct. 26, 2017, which is incorporated herein by reference.

TECHNICAL FIELD

The present disclosure relates to HVAC systems. More particularly, the present disclosure relates to a magnetic filter grille for HVAC systems and to a method of retrofitting a filter grille to have a magnetic closure.

BACKGROUND

Most homes and buildings today have a heating, ventilation, and air conditioning (HVAC) system. A standard component of an HVAC system is the air return. In an effort to ensure that air entering the HVAC unit is clean and filtered, the air intake has a filter. The filter is commonly replaced by opening an outer grille, that is typically made of metal, and replacing the inner filter. However, this arrangement is not ideal. In many instances, the outer grille is secured using one or more latches, which may be difficult to unlatch or which may be broken. If the latches are broken or missing, the grille will not be properly secured. This creates hazardous conditions, especially when the grille is ceiling-mounted. Further, because the grille is typically hinged on one side, it can be cumbersome to access a ceiling-mounted grille when on a ladder—the user may find that they need to reposition themselves and the ladder in order to allow the grille to fully-open and thereby have access to the inner filter.

Accordingly, there is a need for grille that is not subject to latch failure. Further, there is a need for a grille that does not require a hinged-attachment. Still further is the need for a method of easily retrofitting existing grilles to solve the above-mentioned problems. Therefore, the present invention seeks to solve these and other problems.

SUMMARY OF EXAMPLE EMBODIMENTS

In one embodiment, a magnetic closure system for HVAC filter grilles and a method of retrofitting current HVAC filter grilles comprises removing the latches from the grille and/or wall and coupling one or more magnets to the grille; the magnets are interposed between the grille and the inner frame of the grille so that the magnets secure the grille to the inner frame via magnetism.

In one embodiment, a magnetic closure system for HVAC filter grilles comprises a plurality of magnets, a handle, and an inner channel for receiving a filter.

In one embodiment, a magnetic closure system for HVAC filter grilles comprises a plurality of magnets, a handle, and a non-removable filter.

In one embodiment, a magnetic closure system for HVAC filter grilles comprises a plurality of magnets, a coupling aperture, and an inner channel for receiving a filter.

DETAILED DESCRIPTION OF EXAMPLE EMBODIMENTS

Figure 1:
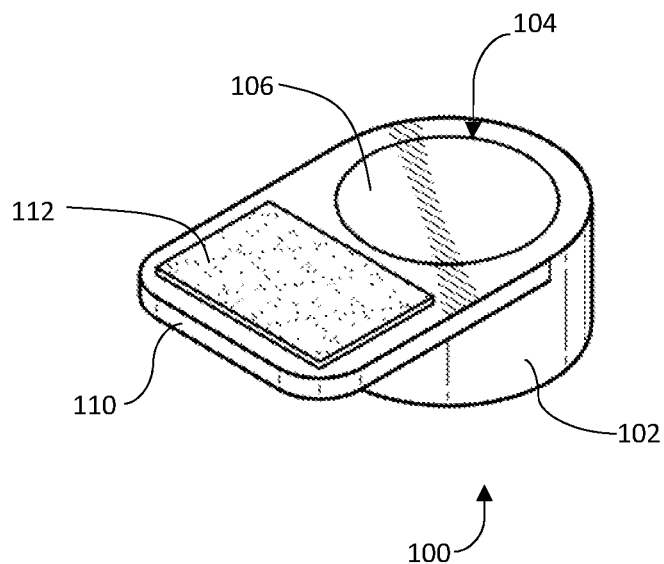
FIG. 1 is a rear perspective view of a magnet housing of a magnetic closure system for HVAC filter grilles.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As will be appreciated from this disclosure, there remains a need for an HVAC filter grille that is not subject to latch failure and that does not require a hinged-attachment. The magnetic closure system for HVAC filter grilles disclosed herein solves these needs and others.

Due to the number of HVAC filter grilles (which may also be referred to simply as "grilles") currently in use, there is a need to provide a simple and effective system and method for retrofitting those grilles to have magnetic closures. Accordingly, in one embodiment, a magnetic closure system for HVAC filter grilles comprises a magnet coupled to the interior of the grille so as to be interposed between the grille and the inner frame that receives the grille. Due to the position of the magnet, the magnet is able to magnetically couple the grille to the inner frame. In one embodiment, the grille is hinged on a first side, with the magnet functioning as the closure mechanism on the second, opposite side. In one embodiment, one magnet may be coupled to the grille. In one embodiment, a plurality of magnets may be coupled to the grille. In one embodiment, the hinges may be removed, with one or more magnets replacing the hinges. In such an embodiment, the grille would be completely withdrawn from the inner frame when replacing the filter therein. It will be appreciated that the magnets may be directly coupled to the grille using magnetism alone, or may also be secured to the grille using one or more adhesives. The adhesives may be removably attachable or permanent.

Figure 2:
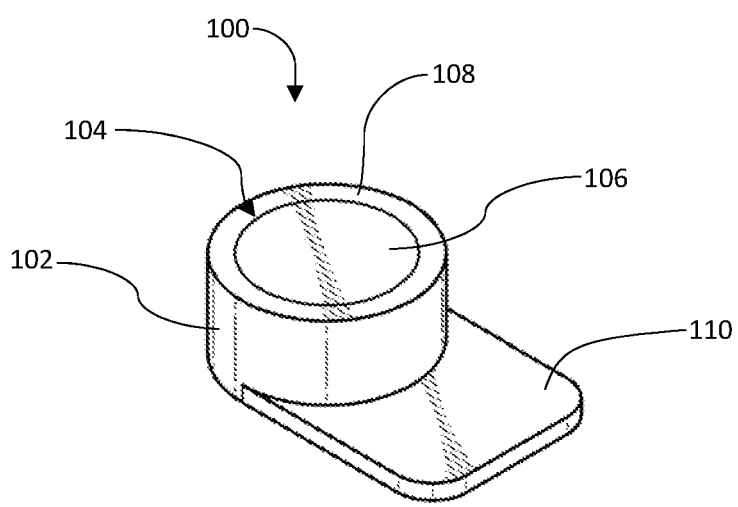
FIG. 2 is a front perspective view of a magnet housing of a magnetic closure system for HVAC filter grilles.

In one embodiment, as shown in FIGS. 1-2, a magnet housing 100 comprises a body 102 and an aperture 104 that receives a magnet 106. The aperture 104 may be larger on a first, rear side (FIG. 1) than on a second, front side (FIG. 2), such as by using a lip 108, so as to prohibit the magnet 106 from passing completely through the aperture 104. The housing 100 may further comprise a flange 110 having an adhesive 112 thereon so as to secure the housing 100 to the grille. It will be understood that while the examples used herein contemplate the housing 100 as being secured to the grille, it may, in the alternative, be secured to the inner frame. Because the magnet 106 is exposed on both sides of the housing 100, it is capable of abutting both the grille and the inner frame, functioning as a magnet closure. While this example contemplates retrofitting grilles, it will be appreciated that grille manufacturers could also form a magnet housing directly into the grille (e.g., an aperture in the grille body), and that such modifications are contemplated herein.

Figure 3:
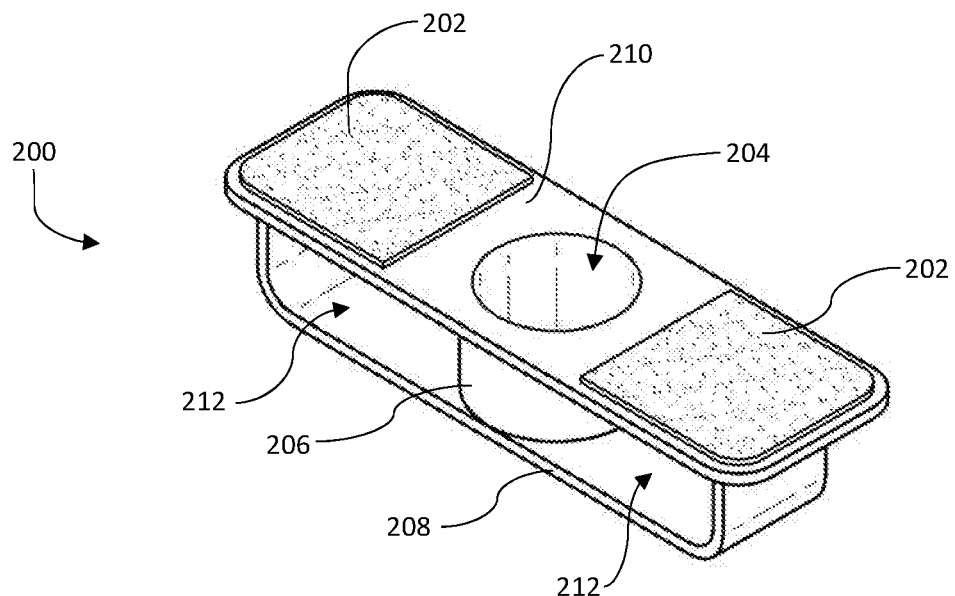
FIG. 3 is a rear perspective view of a handle of a magnetic closure system for HVAC filter grilles.
Figure 4:
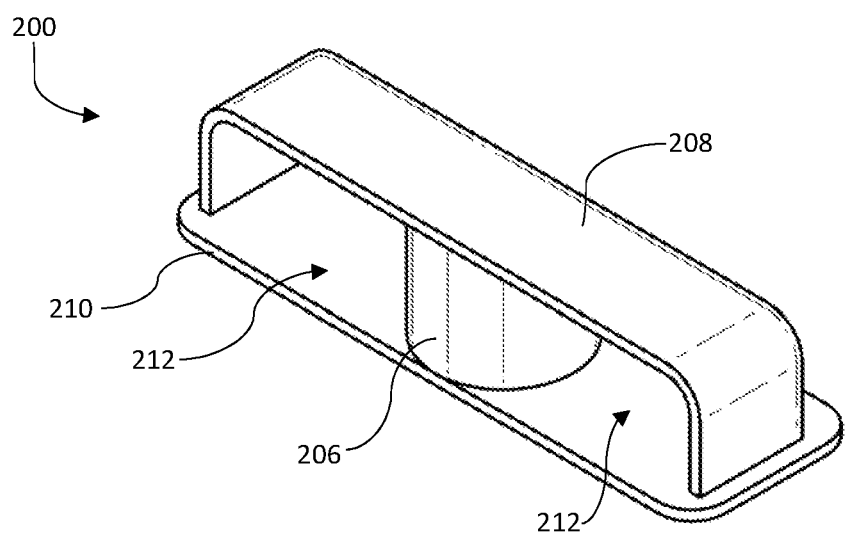
FIG. 4 is a front perspective view of a handle of a magnetic closure system for HVAC filter grilles.
Figure 5:
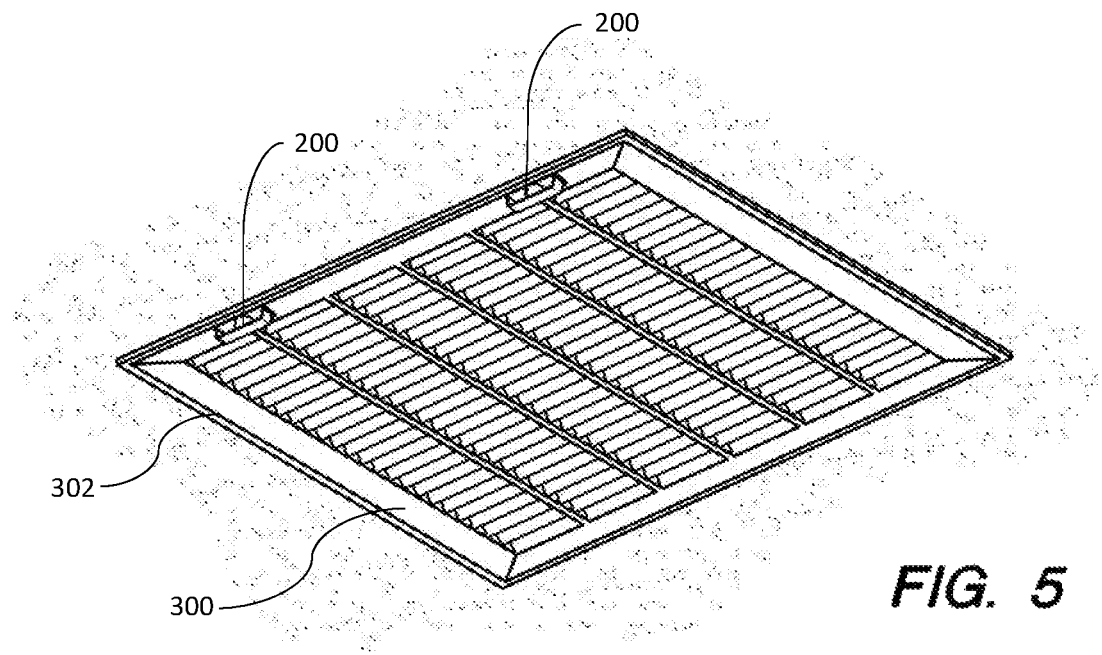
FIG. 5 is a perspective view of a magnetic closure system for HVAC filter grilles with the grille in the closed position.

In an effort to aid a user in opening a magnetically-closed grille, one or more handles 200, as shown in FIGS. 3-4, may be used. FIG. 3 illustrates a first, rear side of the handle 200. As shown, an adhesive 202 may be used on one or more surfaces of the handle 200 so that it may be secured to the grille. The adhesive 202 may be a removably attachable type, or may be a permanent adhesive (both of which are well-known in the adhesive arts). Other methods of securing the handle 200, such as by using a screw or bolt, are also contemplated herein, although they are not preferred. As shown in FIGS. 3-4, an aperture 204 forms a channel 206 for receiving screws or other previous components of the inner frame and/or grille (see FIG. 7 as an example), which makes retrofitting current grilles easy to accomplish. A second surface 208 extends from the first surface 210, covering the opposite end of the aperture 204. This provides an aesthetic appearance when the grille is closed. Because the second surface 208 extends over the channel 206, a gap 212 is formed between the first surface 210 and second surface 208. This gap 212 allows a user to easily grip and pull on the handle 200, allowing them to open or withdraw the grille so as to access the filter therein. However, while second surface 208 forming gap 212 is shown, such configuration is not required. For example, the channel 206 may simply terminate with a cap, with no second surface 208 required, giving the user the ability to simply pull the channel 206 to access the filter while the cap provides the aesthetics. It will be appreciated that numerous configurations for a handle are contemplated, and that merely changing the configuration of the handle will not depart herefrom. Further, it will be appreciated that while this example contemplates handles attachable to a grille, a manufacturer could include handles pre-attached/pre-formed to a filter grille.

Figure 6:
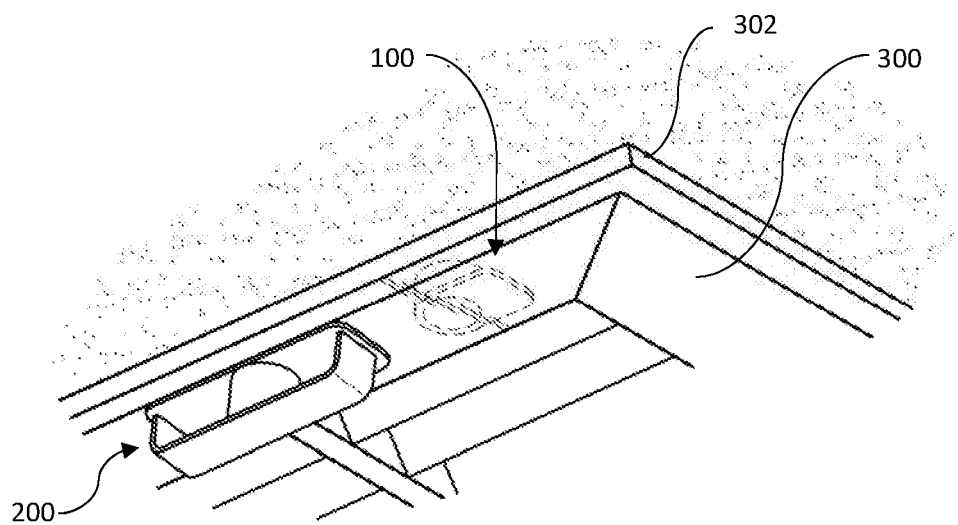
FIG. 6 is a detailed perspective view of a magnetic closure system for HVAC filter grilles with the grille in the closed position.
Figure 7:
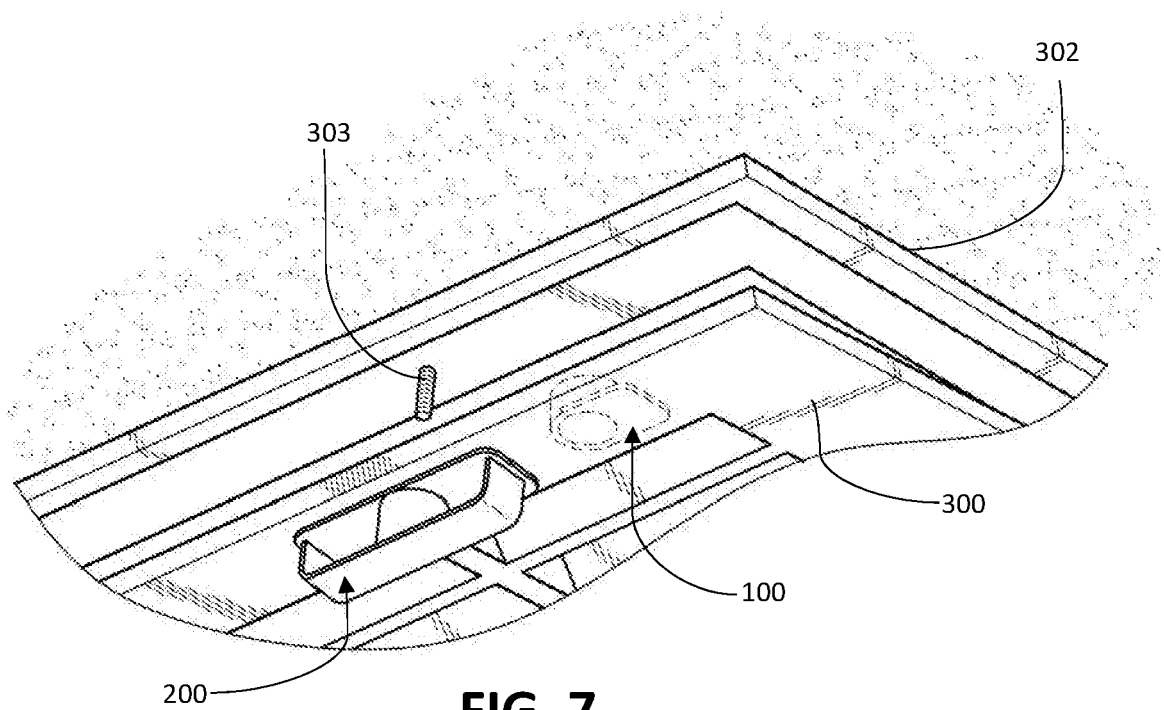
FIG. 7 is a detailed perspective view of a magnetic closure system for HVAC filter grilles with the grille in a partially open position.
Figure 8:
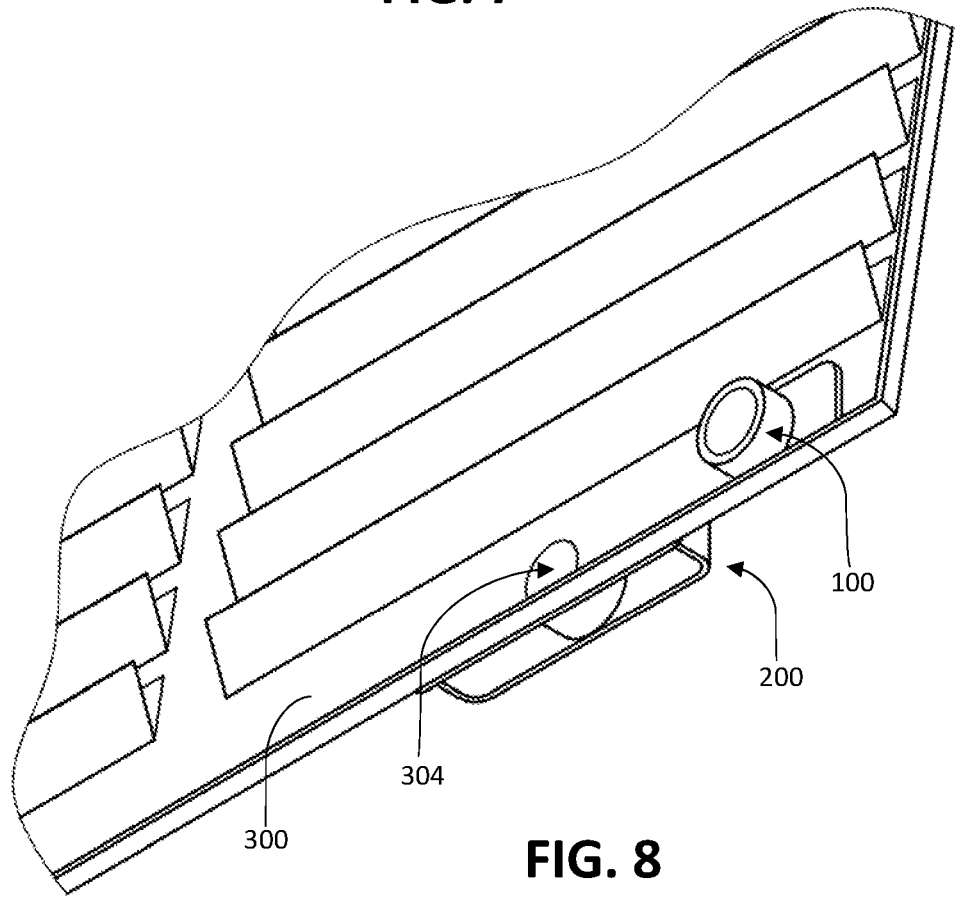
FIG. 8 is a detailed, inside perspective view of a grille of a magnetic closure system for HVAC filter grilles.

FIGS. 5-8 illustrate a magnetic closure system for HVAC filter grilles. FIG. 8 shows a perspective view of a grille 300 having handles 200 coupled thereto (such as by using adhesive 202 on first side 210). FIG. 6 illustrates a closeup, detailed view of the grille 300 in a closed position with regard to inner frame 302. As shown, the magnet housing 100 is interposed between the inner frame 302 and grille 300. The handle 200 is on the exterior of the grille 300 so as to remain accessible by a user. As shown, the handle 200 may be offset from the magnet housing 100. This is desirable where the inner frame has components that would otherwise protrude through, and out of, the grille 300, such as the threaded rod of the original closure mechanism of a prior art HVAC filter grille system, as best seen in FIG. 7. Referring to FIGS. 7-8, the threaded rod 303 aligns with a port 304 (FIG. 8) in the grille 300. The aperture 204 (FIG. 3) of handle 200 aligns with port 304 so that as the threaded rod 303 passes through the port 304, it enters the aperture 204 and is concealed within channel 206. It will be appreciated that while the handle is shown and described as having an aperture 204 and channel 206 for receiving other components of a prior latch/closure, such limitations are not required. In other words, the handle 200 need not have an aperture 204 and channel 206 and may instead simply have a means for grasping or otherwise exerting a force on the grille 300 so as to withdraw it from the inner frame 302. The means may be a simple knob or other protrusion.

In one method of using the magnetic closure system to retrofit a current HVAC filter system, the method comprises removing the latches or current closure system from the grille 300; coupling one or more magnets 106 to the grille 300 (either directly, or using a housing 100); wherein the magnets 106 are interposed between the grille 300 and the inner frame 302 so that the magnets 106 secure the grille 300 to the inner frame 302 via magnetism. By utilizing magnets 106, latches are not required to keep the grille 300 secured to the inner frame 302. Accordingly, the problem of latch failure is solved using the magnetic closure system for HVAC filter grilles described herein. Further, in instances where the grille hinges are removed, the entire grille 300 is secured to the inner frame 302 using magnetism and the entire grille 300 may be removed to more easily access the filter. However, a grille that is hinged on one side may only need one or two magnets on the side opposite the hinges to keep it secured to the inner frame. Accordingly, one magnet to a plurality of magnets may be used as part of the magnetic closure system.

It will further be appreciated that various grille configurations may be used. For example, in one embodiment, an HVAC filter grille comprises a plurality of magnets, a handle, and a filter channel for receiving a filter. Accordingly, a user may remove the grille from the wall/ceiling (as opposed to opening it on hinges) by pulling on one or more handles. Once the grille is removed, the user may remove and reinsert a filter into the filter channel of the grille. Once the filter is replaced, the user simply places the grille back in the grille aperture (i.e., inner frame) of the wall/ceiling, where the magnets secure it in place. While an inner frame is typically used, it will be appreciated that any metal or magnetic object may be used in the ceiling/wall to secure the grille thereto via the magnets.

In yet another embodiment, an HVAC filter grille comprises a plurality of magnets, a handle, and a non-removable filter. Effectively, the grille and filter of a traditional system are combined into a single unit, where the filter simultaneously functions as the grille. In such an arrangement, the grille would be entirely disposed of when the filter is ready for replacement. While the grille may have an outer edge of plastic, it may be preferable to use cardboards or other materials for the filter portion, as is current in the art. In such an instance, the filters may simply be adhered to either the inner or outer edges using standard adhesives (e.g., glue). The filter may be designed with one or more outward designs, such that the aesthetics may be maintained in a house, office, or other structure. Therefore, a user may easily remove the filter grille, discard it, and replace it with a new one.

Figure 9:
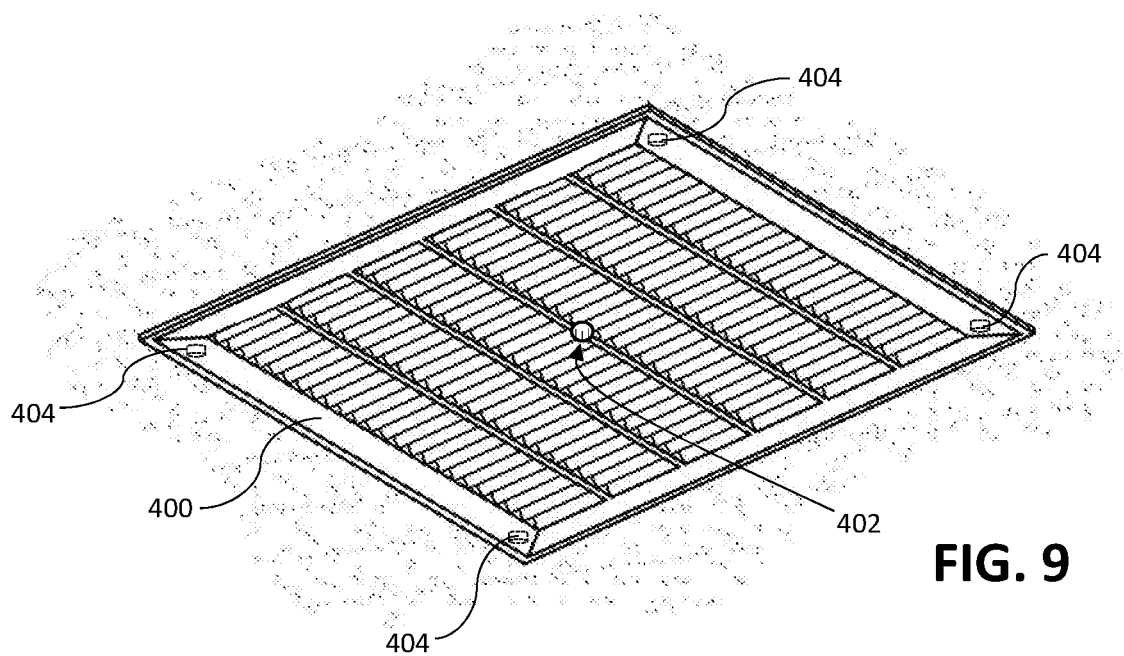
FIG. 9 is a perspective view of a magnetic closure system for HVAC filter grilles with the grille closed and magnetically secured to a ceiling.

In one embodiment, as shown in FIG. 9, a magnetic closure system for HVAC filter grilles comprises a grille 400, a coupling receptacle 402, and a plurality of magnets 404 (the magnets are shown in dashed lines as they are interposed between the grille 400 and the ceiling and wouldn't otherwise be visible in this view). In this embodiment, the grille 400 is not hinged to the ceiling, but is, instead, fully-removable from the ceiling. The grille 400 is held to the ceiling using magnets 404, the magnets 404 being magnetically coupled to an inner frame, metal plates or surfaces, or other magnetic surface in the ceiling. To remove the grille 400 from the ceiling, a user may use a pole that is insertable into the coupling receptacle 402. For example, the pole may comprise a threaded male end and the coupling receptacle 400 may comprise threads to receive the threaded pole. Other pole-receptacle configurations may also be used, such as a twist and lock configuration, or other method. Once the pole is coupled to the coupling receptacle 402, a user may exert a downward force, overcoming the magnetism and withdrawing the grille 400. The filter is ideally coupled to the grille 400 (e.g., receiving channels, hooks and loops, straps, etc.) so that a user may easily change the filter without needing a ladder. Once the new filter has been inserted or otherwise coupled to the grille 400, the user may push the grille 400 back into the ceiling, where the magnets 404 secure it in place. Once magnetically secured, the user then removes the pole from the coupling receptacle 402. The grille 400 may be manufactured from a number of materials, including plastic, fiberglass, carbon fiber, aluminum, metal, or some combination thereof. Having the grille 400 made from a lightweight plastic allows for easier and less dangerous removal from the ceiling, and also allows smaller magnets to be used (less weight to magnetically hold in position). By utilizing the coupling receptacle 402, a user need not ascend a ladder to change a filter, which saves time and eliminates the risk of falling, which is a substantial improvement over the prior art.

Therefore, it will be appreciated that the magnetic closure system for HVAC filter grilles disclosed herein solves the need for an HVAC filter grille that is not subject to latch failure, that does not require a hinged-attachment, and that does not require a ladder for changing when ceiling mounted.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A magnetic closure system for HVAC filter grilles, the magnetic closure system comprising: an HVAC filter grille;
   a magnet;
   a magnet housing, the magnet housing comprising an aperture for receiving the magnet and a flange extending perpendicularly to the aperture, the flange comprising an adhesive thereon, the adhesive adhering the flange and magnet housing to the HVAC filter grille;
   the magnet housing positioned so as to be interposed between the HVAC filter grille and an inner frame for receiving the HVAC filter grille, the magnet housing and magnet abutting both the filter grille and inner frame so as to magnetically couple the HVAC filter grille to the inner frame; and
   at least one handle on the exterior surface of the HVAC filter grille, the at least one handle comprising an aperture forming a channel for receiving a protrusion of the inner frame, with a first surface and a second surface forming a gap configured to receive a user's finger.

2. The magnetic closure system of claim 1, wherein the at least one handle comprises an adhesive for adhering to the HVAC filter grille.

3. The magnetic closure system of claim 1, wherein the protrusion is a bolt.

* * * * *